US010293796B2

(12) United States Patent
Georgin

(10) Patent No.: US 10,293,796 B2
(45) Date of Patent: May 21, 2019

(54) ANTISKID BRAKE CONTROL SYSTEM WITH MINIMUM DISRUPTION AUTOBRAKE FUNCTION

(71) Applicant: Goodrich Corporation, Charlotte, NC (US)

(72) Inventor: Marc Georgin, Dayton, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 15/210,548

(22) Filed: Jul. 14, 2016

(65) Prior Publication Data

US 2018/0015911 A1 Jan. 18, 2018

(51) Int. Cl.
B60T 8/17 (2006.01)
B60T 8/171 (2006.01)
B60T 8/172 (2006.01)
B60T 8/1761 (2006.01)

(52) U.S. Cl.
CPC .......... B60T 8/1703 (2013.01); B60T 8/171 (2013.01); B60T 8/172 (2013.01); B60T 8/17616 (2013.01)

(58) Field of Classification Search
CPC ........ B60T 8/1703; B60T 8/171; B60T 8/172; B60T 8/17616
See application file for complete search history.

(56) References Cited

U.S. PATENT DOCUMENTS 3,920,204 A * 11/1975 Bissell .................. B60T 8/1703
244/111
4,007,970 A 2/1977 Gordon
5,024,491 A * 6/1991 Pease, Jr. ................ B60T 7/12
303/126
6,513,885 B1 * 2/2003 Salamat ............... B60T 8/1703
303/122.09
9,073,634 B2 7/2015 Thibault
9,205,918 B2 12/2015 Cahill
2004/0220714 A1 * 11/2004 Rudd, III .............. B60T 8/1703
701/71
2016/0009385 A1 1/2016 Van Deventor

FOREIGN PATENT DOCUMENTS

EP 2871104 A1 5/2015
GB 2411934 9/2005
WO WO 0069721 A1 11/2000

OTHER PUBLICATIONS

Extended European Search Report dated Nov. 15, 2017 in European Application No. 17174623.3.

* cited by examiner

Primary Examiner — Aaron L Troost
(74) Attorney, Agent, or Firm — Snell & Wilmer, L.L.P.

(57) ABSTRACT

A method for controlling brakes may comprise detecting, by a brake control unit (BCU), an aircraft speed, determining, by the BCU, that the aircraft speed is at least one of at or above a threshold value, determining, by the BCU, that an auto-brake control has been enabled, receiving, by the BCU, an antiskid desired pressure that is output from an antiskid control, the BCU comprising a brake control executive (BKX), the antiskid desired pressure being received by the BCU, and receiving, by the BCU, a desired pressure comprising at least one of a deceleration control desired pressure from a deceleration control (DK) or a pilot desired pressure from a manual brake control, the desired pressure being received by the BKX.

18 Claims, 3 Drawing Sheets

ANTISKID BRAKE CONTROL SYSTEM WITH MINIMUM DISRUPTION AUTOBRAKE FUNCTION

FIELD

The present disclosure relates generally to the field of brake control systems, and more specifically to systems and methods for aircraft brake control.

BACKGROUND

Aircraft brake control systems typically employ a brake control unit (BCU). The BCU may receive brake commands from an antiskid control as well as brake commands from a pilot. The BCU generally produces a pressure command which is usually the minimum of the pilot desired pressure and the antiskid desired pressure. This pressure command is generally sent to a pressure control for controlling pressure being supplied to a brake of an aircraft wheel for braking.

SUMMARY

Systems and methods disclosed herein may be useful for providing braking to aircraft brakes. In this regard, a method for controlling brakes may comprise detecting, by a brake control unit (BCU), an aircraft speed, determining, by the BCU, that the aircraft speed is at least one of equal to or greater than a threshold value, determining, by the BCU, that an auto-brake control has been enabled, receiving, by the BCU, an antiskid desired pressure that is output from an antiskid control, the BCU comprising a brake control executive (BKX), and receiving, by the BCU, a desired pressure comprising at least one of a deceleration control desired pressure from a deceleration control (DK) or a pilot desired pressure from a manual brake control, the desired pressure being received by the BKX.

In various embodiments, the receiving the desired pressure may comprise receiving the deceleration control desired pressure in response to the auto-brake control being enabled. The receiving the desired pressure may comprise receiving the pilot desired pressure in response to a manual control being operated. The method may further comprise sending, by the BCU, a pressure command from the BKX to a pressure control (PK), the pressure command comprising a minimum value of the deceleration control desired pressure and the antiskid desired pressure. The method may further comprise sending, by the BCU, a pressure command from the BKX to a pressure control (PK), the pressure command comprising a minimum value of the pilot desired pressure and the antiskid desired pressure. The receiving the desired pressure may be in response to the aircraft speed being at least one of equal to or greater than the threshold value. The receiving the desired pressure may be in response to a switch logic determining to send at least one of the deceleration control desired pressure or the pilot desired pressure. The BCU may switch from receiving the deceleration control desired pressure to receiving the pilot desired pressure in response to the manual brake control being operated. The antiskid desired pressure may be determined independent from the DK.

A brake control system may comprise a set of pilot controls including an auto-brake control and a manual brake control, a brake control unit (BCU) comprising a brake control executive (BKX) and a switch logic, a deceleration control (DK) in electronic communication with the BCU, wherein the DK is configured to receive a deceleration command from the auto-brake control and configured to send a DK desired pressure value to the BKX, and an antiskid control (ASK) in electronic communication with the BCU, wherein the BKX is configured to receive an ASK desired pressure value from the ASK, wherein the switch logic is configured to send at least one of the DK desired pressure value from the DK to the BKX or a pilot desired pressure value from the manual brake control to the BKX.

In various embodiments, in response to the BCU receiving both the DK desired pressure value and the pilot desired pressure value simultaneously, the switch logic may be configured to send the pilot desired pressure value to the BKX. The brake control system may further comprise a pressure control unit (PK), wherein the PK is configured to receive a pressure command and output a current command in response to the pressure command, and an aircraft brake having a brake control device configured to apply a pressure or force in response to the current command. The BKX may be configured to set the pressure command to a minimum value selected from the DK desired pressure value and the ASK desired pressure value. The BKX may be configured to set the pressure command to a minimum value selected from the pilot desired pressure value and the ASK desired pressure value. The pilot desired pressure value and the DK desired pressure value may be received in parallel by the BCU.

A brake control system may comprise a processor, a tangible, non-transitory memory configured to communicate with the processor, the tangible, non-transitory memory having instructions stored thereon that, in response to execution by the processor, cause a brake control unit (BCU) to perform operations comprising detecting, by a brake control unit (BCU), an aircraft speed, determining, by the BCU, that the aircraft speed is at least one of equal to or greater than a threshold value, determining, by the BCU, that an auto-brake control has been enabled, receiving, by the BCU, an antiskid desired pressure that is output from an antiskid control, and receiving, by the BCU, a desired pressure in response to the aircraft speed being at least one of equal to or greater than the threshold value, wherein the desired pressure comprises at least one of a deceleration control desired pressure or a pilot desired pressure.

In various embodiments, the receiving the desired pressure may comprise receiving the deceleration control desired pressure in response to the auto-brake control being enabled. The receiving the desired pressure may comprise receiving the pilot desired pressure in response to a manual control being operated. The operations may further comprise sending, by the BCU, a pressure command from a brake control executive (BKX) to a pressure control (PK), the pressure command comprising a minimum value of the deceleration control desired pressure and the antiskid desired pressure. The operations may further comprise sending, by the BCU, a, pressure command from a brake control executive (BKX) to a pressure control (PK), the pressure command comprising a minimum value of the pilot desired pressure and the antiskid desired pressure.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In the context of the present disclosure, systems and methods may find particular use in connection with aircraft wheel and brake control systems. However, various aspects of the disclosed embodiments may be adapted for optimized performance with a variety of components and in a variety of systems. As such, numerous applications of the present disclosure may be realized.

Auto-brake control may refer to a control whereby a user may select a desired deceleration value utilized by the control system to provide the selected deceleration rate to a vehicle. As described herein, auto-brake control is realized with minimal disruption to the antiskid control. In this regard, an antiskid control system may be tuned independent of the auto-brake control, and vice-versa.

Figure 1:
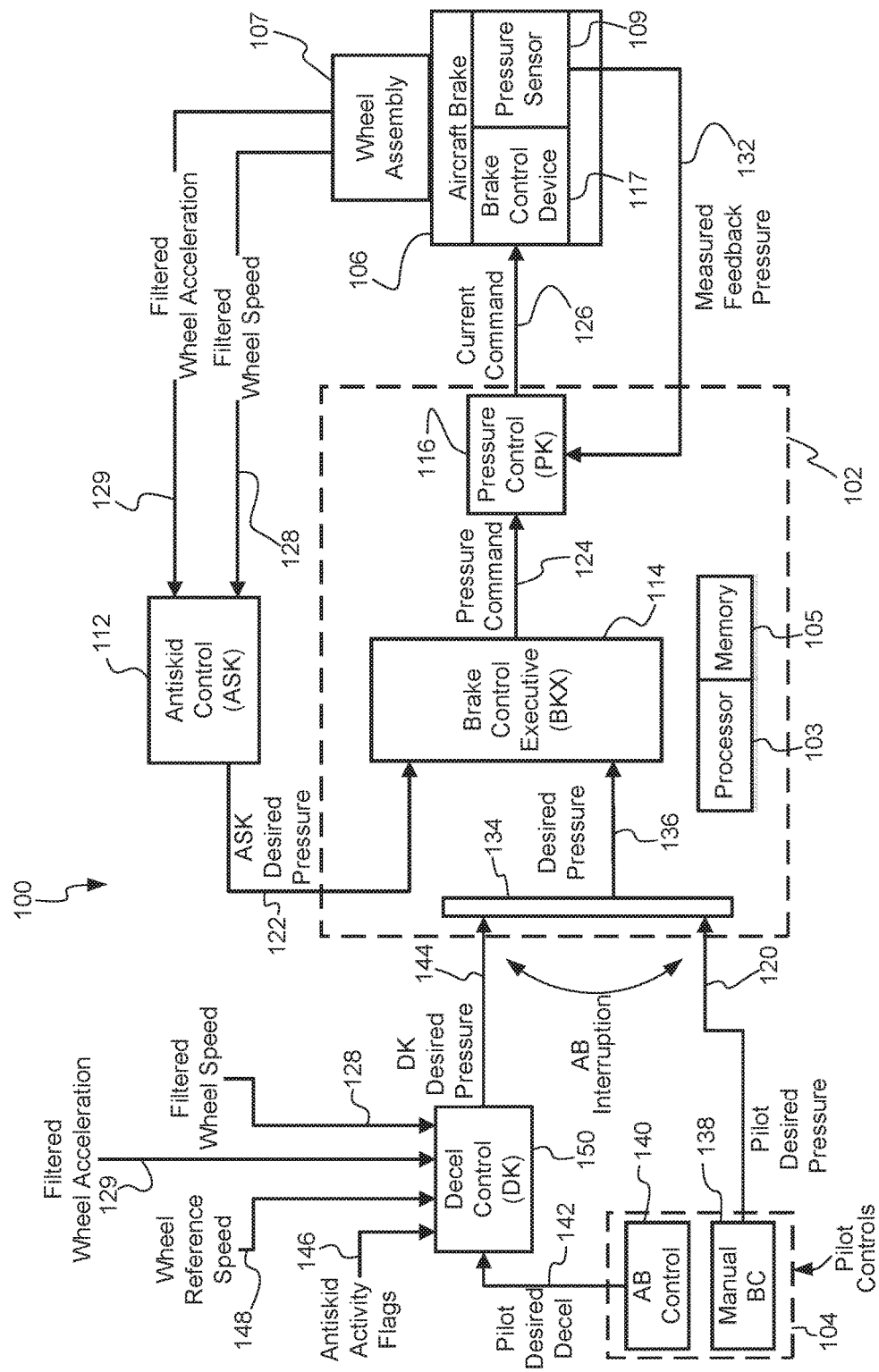
FIG. 1 illustrates a schematic view of a system for aircraft braking, in accordance with various embodiments.

Referring to FIG. 1, system 100 for aircraft braking may provide auto-braking control by controlling brake 106. The system 100 includes a brake control unit (BCU) 102, a deceleration control (DK) 150, a set of pilot controls 104, the brake 106, and a wheel assembly 107. In various embodiments, the system 100 may include antiskid control (ASK) 112. In various embodiments, DK 150 may comprise instructions stored in memory 105. In various embodiments, wheel assembly 107 may comprise a tire mounted to a wheel.

In various embodiments, brake 106 may apply stopping force in response to pressure applied by brake control device 117. Brake control device 117 may be an electronically controlled servo configured to actuate a hydraulic valve and thereby control the stopping force generated by brake 106. Brake control device 117 may receive an instruction to apply pressure to one or more friction disks of the brake 106. In response, the brake control device 117 may open and/or close a hydraulic valve to varying degrees to adjust the pressure applied to brake 106, thus decelerating the wheel assembly 107 in a controlled manner. This pressure may be referred to as a braking pressure.

In various embodiments, brake control device 117 may also be an electromechanical brake actuator configured to actuate a puck against the brake stack in response to a current and/or voltage applied to the actuator. The force of the puck compressing the brake stack provides braking torque to stop wheel assembly 107.

In various embodiments, the BCU 102 may include one or more processors 103 and one or more tangible, non-transitory memories 105 in communication with processor 103. Processors 103 are capable of implementing logic. The processor 103 can be a general purpose processor, a digital signal processor (DSP), an application specific integrated circuit (ASIC), a field programmable gate array (FPGA) or other programmable logic device, discrete gate or transistor logic, discrete hardware components, or a combination of processing logic.

In various embodiments, the BCU 102 may include brake control executive (BKX) 114 and may include pressure control (PK) 116. In various embodiments, BKX 114 may comprise instructions stored in memory 105. In various embodiments, PK 116 may comprise instructions stored in memory 105. BCU 102 may also include switch logic 134. In various embodiments, switch logic 134 may comprise instructions stored in memory 105. Switch logic 134 may be a logic configured to receive at least two signals and send only one of the at least two signals to BKX 114. In this regard, although illustrated as a distinct signal, desired pressure command 136 may comprise either deceleration control desired pressure value (DK desired pressure value) 144 or pilot desired pressure value 120, as described in further detail below.

In various embodiments, a pilot may control brake 106 using pilot controls 104. Pilot controls 104 may include manual brake control (manual BC) 138. Manual BC 138 may comprise a pedal, handle, or the like. For example, manual BC 138 may comprise a pedal located in the cockpit of an aircraft whereby a pilot may apply a force to control brake 106. Pilot controls 104 may include auto-brake control (AB control) 140. AB control 140 may comprise one or more switches, dials, knobs, buttons, or any other suitable means for selecting a pilot desired deceleration value (also referred to herein as a deceleration command) 142.

In various embodiments, when it is desired for a pilot to use manual BC 138, a pilot may deflect a handle, pedal, or the like to send a pilot desired pressure value 120 to the BOLT 102 that corresponds to a desired amount of braking. In this regard, the BCU 102 may receive pilot desired pressure value 120. As illustrated in FIG. 1, switch logic 134 may send pilot desired pressure value 120 to BKX 114 as desired pressure command 136. In this regard, desired pressure command 136 may comprise pilot desired pressure value 120. Although illustrated as being received as desired pressure command 136 via switch logic 134, BKX 114 may receive pilot desired pressure value 120 directly, or via any other suitable means, in accordance with various embodiments. The pilot desired pressure value 120 may be generated or altered in response to a depression of a brake pedal within a cockpit of the aircraft. The pilot desired pressure value 120 may also be generated or altered in response to an instruction to retract landing gear of the aircraft.

In various embodiments, when it is desired for a pilot to use AB control 140, a pilot may use a switch, dial, knob, button, or any other suitable means to select a pilot desired deceleration value 142. For example, pilot desired deceleration value 142 may comprise a value such as, for example, 1.8, 2.4, 3.0, or 5.0 meters per second squared (m/s²) sir any deceleration value suitable to a braking application as determined based on aircraft weight, speeds, and braking capability. In various embodiments, the pilot desired deceleration value 142 may be a fixed value. However, pilot desired deceleration value 142 may comprise any suitable value.

In various embodiments, DK 150 may receive filtered wheel speed value 128, filtered wheel acceleration value 129, wheel reference speed 148, and antiskid activity flags 146. Wheel reference speed 148 may comprise a value corresponding to the speed of wheel assembly 107 as if wheel assembly were free rolling (i.e., no braking applied). Antiskid activity flags 146 may comprise a signal indicating to DK 150 that wheel assembly 107 is locked (not rotating) or skidding (wheel skid). For example, in response to a deceleration of the rotational velocity of wheel assembly 107, antiskid activity flags 146 may disable DK 150 and prevent brakes 106 from applying braking.

DK 150 may receive pilot desired deceleration value 142 and use pilot desired deceleration value 142 to calculate DK desired pressure value 144. The DK 150 can output desired pressure value 144 corresponding to a desired amount of pressure to be applied to the brake 106 based on the filtered wheel speed value 128, the filtered wheel acceleration value 129, wheel reference speed 148, and antiskid activity flags 146. DK 150 may send DK desired pressure 144 to BCU 102. Thus, BCU 102 may receive DK desired pressure value 144. BKX 114 may receive DK desired pressure value 144. In this regard, desired pressure command 136 may comprise DK desired pressure value 144, in accordance with various embodiments. Although illustrated as being received as desired pressure command 136 via switch logic 134, BKX 114 may receive DK desired pressure value 144 directly, or via any other suitable means, in accordance with various embodiments. In this regard, DK 150 may be in electronic communication with BCU 102.

In various embodiments, pilot desired pressure value 120 may take priority over DK desired pressure value 144. For example, switch logic 134 may send pilot desired pressure value 120 to BKX 114 in response to BCU 102 receiving both pilot desired pressure value 120 and DK desired pressure value 144 simultaneously. In this regard, a pilot may override AB control 140 in response to operating manual BC 138.

In various embodiments, brake 106 may also be controlled by an antiskid control unit 112 (ASK) that is part of a brake control algorithm unit. The brake control algorithm unit may include the ASK 112, the brake control executive 114 (BKX), DK 150, and the pressure control 116 (PK). The brake control algorithm is illustrated as a component of BCU 102, but may also be implemented outside BCU 102 and operate in concert with BCU 102. In that regard, the BCU may include one or more of the ASK 112, BKX 114, DK 150, and/or PK 112. Each of the components may also implemented outside BCU 102. In various embodiments, ASK 112 may comprise instructions stored in memory 105.

In various embodiments, ASK 112 may receive a filtered wheel speed value 128 from the wheel assembly 107, and a filtered wheel acceleration value 129 from the wheel assembly 107. The ASK 112 can output a desired pressure command value 122 corresponding to a desired amount of pressure to be applied to the brake 106 based on the filtered wheel speed value 128 and the filtered wheel acceleration value 129. The desired pressure command value may be based on an algorithm for reducing the likelihood of the aircraft skidding. In this regard, ASK 112 may be in electronic communication with BCU 102.

The BKX 114 receives both the desired pressure command 136 and the desired pressure command value 122 and issues a pressure command value 124 based on the desired pressure command 136 and the desired pressure command value 122. In various embodiments, the pressure command value 124 may be equal to the minimum value of the desired pressure command value 122 and the desired pressure command 136. The pressure command value 124 corresponds to a desired amount of pressure to be applied to the brake 106. In this regard, the ASK desired pressure command value 122 is independent from DK Desired Pressure 144.

The PK 116 may receive the pressure command value 124 and may convert the pressure command value 124 into a current command value 126. Current command value 126 may be a current measured in Amperes such as, for example, a current from the range of 2 mA-30 mA. The current command value 126 may be received by the brake control device 117 of the brake 106. Brake control device 117 may be designed to convert the current command value 126 into a pressure. The pressure may be applied to one or more disks of a disk brake system of the brake 106. The relationship between received current of brake control device 117 and the amount of pressure applied may generally be linear. For example, in various embodiments the relationship may be described as current=

$$\frac{\text{pressure}}{151.2 \text{ psi/ma}} + 5.5 \text{ ma.}$$

In various embodiments, PK 116 may use the predetermined relationship between current and pressure to determine the current command value 126 based on the known pressure command value 124.

In various embodiments, PK 116 may also use another predetermined relationship for determining the current command value 126 based on the pressure command value 124. The PK 116 may also determine the current command value 126 based on a detected pressure value 132 corresponding to a detected pressure applied to the one or more disks of the brake 106. In that regard, the determination of the current command value 126 may be based on a feedback system such that the current command value 126 is adjusted in an attempt to equalize the measured pressure value 132 and the pressure command value 124 based on the aforementioned relationship.

In various embodiments, brake 106 may include a pressure sensor 109 for measuring the pressure applied by the brake control device 117. The pressure sensor 109 may transmit the measured pressure value 132 to PK 116 for feedback control of brake control device 117. In embodiments using an electromechanical actuator for brake control device 117, pressure sensor 109 may comprise a force sensor in the form of a load cell output and/or a force estimation.

In various embodiments, the system 100 may extend auto-braking equal to or greater than the wheel speed sensor dropout speed (WSSDS). The WSSDS may be the speed under which auto-braking becomes disabled because of wheel speed sensor resolution. For example, the wheel speed sensor dropout speed may be 10 knots. The wheel speed sensor dropout speed may also be 5 knots. The antiskid dropout speed may further be 3 knots. The speed thresholds may be determined with variation to the speeds based on the weight, speeds, wheel size, etc. of an aircraft.

Figure 2:
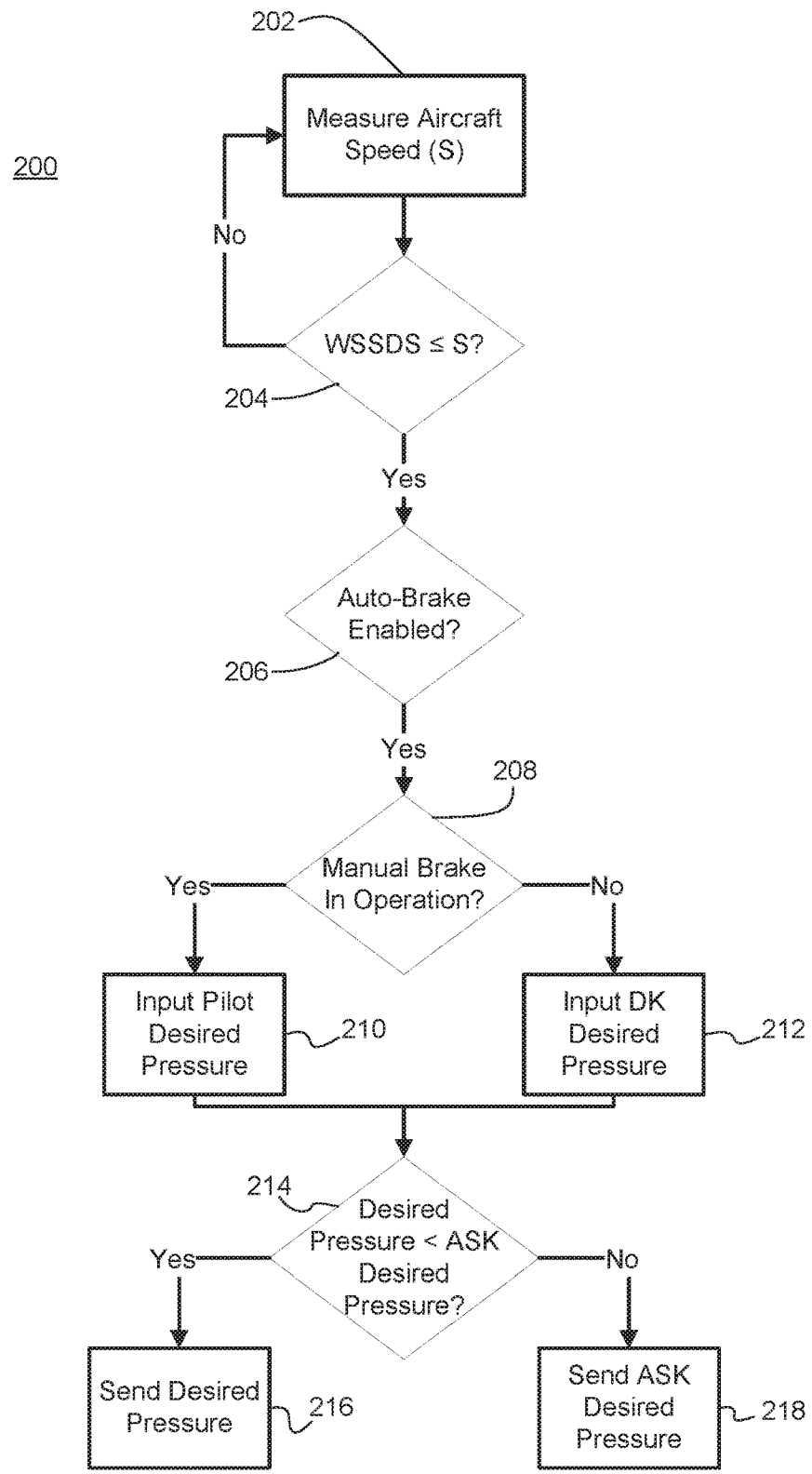
FIG. 2 illustrates a flow diagram for providing auto-braking using the system of FIG. 1, in accordance with various embodiments.

With reference to FIG. 2, a flow diagram 200 is shown for providing auto-braking using system 100 (see FIG. 1). With combined reference to FIG. 1 and FIG. 2, BCU 102 may measure the aircraft speed S (Block 202). Speed S may be measured using wheel speed transducers in wheel assembly 107 to transmit filtered wheel speed value 128 and filtered wheel acceleration value 129 measurements to BCU 102.

In various embodiments, BCU 102 may check whether the aircraft speed S is equal to or greater than WSSDS (WSSDS≤S?) in Block 204. If aircraft speed is equal to or greater than WSSDS, BCU 102 may check whether AB control 140 has been enabled (Block 206). If the aircraft speed is not equal to or greater than WSSDS, the BCU 102 may continue monitoring and/or measuring aircraft speed.

In various embodiments, in response to AB control 140 being enabled, BCU 102 may check whether manual BC 138 is in operation (Block 208). For example, BCU 102 may determine if a pilot has deflected a pedal or handle in the cockpit of the aircraft to manually apply braking to brake 106. If manual BC 138 is in operation, then pilot desired pressure 120 may be input to BKX 114 (block 210). If manual BC 138 is not in operation, then DK desired pressure 144 may be input to BKX 114 (block 212). In this regard, manual BC 138 may take priority over AB control 140.

In various embodiments, BCU 102 may check whether ASK desired pressure 122 or desired pressure 136 is greater (block 214). BKX 114 may send the pressure having the lower value. For example, BCU may determine if desired pressure 136 is less than ASK desired pressure 122. BKX 114 may send desired pressure 136 to PK 116 in response to desired pressure 136 having a lower value than ASK desired pressure 122 (see block 216). BKX 114 may send ASK desired pressure 122 to PK 116 in response to ASK desired pressure 122 having a lower value than desired pressure 136 (see block 216). In response to desired pressure 136 and ASK desired pressure 122 having similar values, BKX may send either ASK desired pressure 122 or desired pressure 136.

Figure 3:
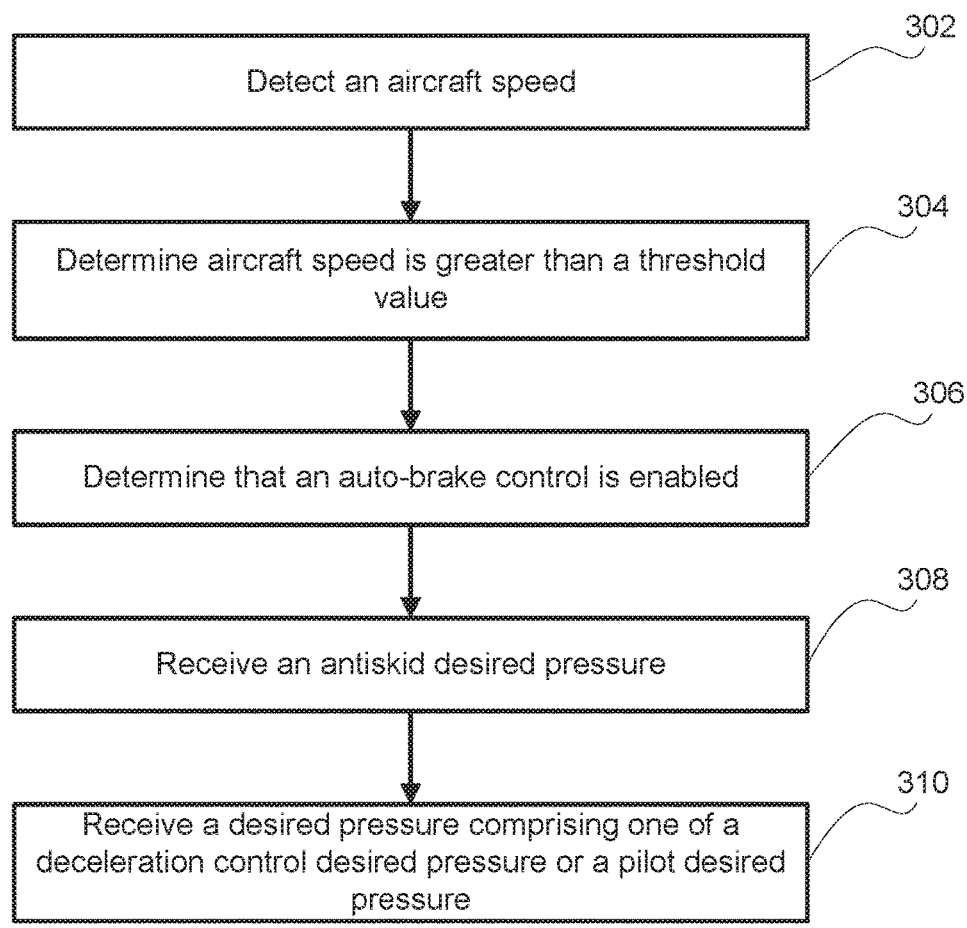
FIG. 3 illustrates a method for controlling brakes using the system of FIG. 1, in accordance with various embodiments.

With reference to FIG. 3, a method 300 for controlling brakes using brake control system 100 is shown, in accordance with various embodiments. Method 300 may be similar to or the same as the process depicted by flow diagram 200, but presented in a linear manner. Method 300 may include detecting an aircraft speed (step 302). Method 300 may include determining that the aircraft speed is greater than a threshold value (step 304). Method 300 may include determining that an auto-brake control is enabled (step 306). Method 300 may include receiving an antiskid desired pressure (step 308). Method 300 may include receiving a desired pressure comprising one of a deceleration control desired pressure or a pilot desired pressure (step 310).

With combined reference to FIG. t and FIG. 3, step 302 may include detecting a wheel speed based upon filtered wheel speed value 128. Step 304 may include determining that the wheel speed is greater than a threshold value. For example, the threshold value may be the WSSDS. Step 306 may include determining that AB control 140 is enabled. Step 308 may include receiving, by BCU 102, and more specifically by BKX 114, ASK desired pressure 122. Step 310 may include receiving, by BCU 102, and more specifi-cally by BKX 114, desired pressure 136, wherein the desired pressure 136 comprises either DK desired pressure 144 or a pilot desired pressure 120.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B. or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for controlling brakes using a brake control system comprising, a set of pilot controls including an auto-brake control and a manual brake control, a brake control unit (BCU) comprising a brake control executive (BKX) and a switch logic, the BKX in electronic communication with the switch logic, a deceleration control (DK) in electronic communication with the BCU, and an antiskid control (ASK) in electronic communication with the BCU, the method comprising:

receiving, by the DK, a deceleration command from an auto-brake control;
receiving, by the DK, a wheel speed value associated with one or more wheels;
receiving, by the DK, a wheel acceleration value associated with the one or more wheels;
generating, by the DK, a DK desired pressure value for each of the one or more wheels, the DK desired pressure value based upon the deceleration command, wheel speed value, and the wheel acceleration value;
receiving, by the BKX, an ASK desired pressure value from the ASK;
sending, via the switch logic, at least one of the DK desired pressure value from the DK to the BKX or a pilot desired pressure value from the manual brake control to the BKX; and
controlling, by the brake control system, a braking force for the one or more wheels based upon the DK desired pressure value.

2. The method of claim 1, further comprising receiving, by the BKX, a desired pressure comprising at least one of the DK desired pressure value from the DK or the pilot desired pressure value from the manual brake control, wherein the receiving the desired pressure comprises receiving the DK desired pressure value in response to the auto-brake control being enabled and receiving the pilot desired pressure value in response to the manual brake control being operated.

3. The method of claim 2, further comprising sending, by the brake control system, a pressure command from the BKX to a pressure control (PK), wherein in response to the auto-brake control being enabled the pressure command comprises the minimum value of the DK desired pressure value and the ASK desired pressure value, and in response to the manual brake control being operated the pressure command comprises the minimum value of the pilot desired pressure value and the antiskid desired pressure value.

4. The method of claim 2, further comprising:
detecting, by the brake control system, an aircraft speed;
determining, by the brake control system, that the aircraft speed is at least one of equal to or greater than a threshold value;
determining, by the brake control system, that an auto-brake control has been enabled; and
receiving, by the brake control system, the ASK desired pressure value that is output from the ASK.

5. The method of claim 4, wherein the receiving the desired pressure is in response to the aircraft speed being at least one of equal to or greater than the threshold value.

6. The method of claim 3, further comprising:
sending, by the brake control system, a first current command value to a brake control device in response to the auto-brake control being enabled, the first current command value corresponding to a minimum value of the DK desired pressure value and the antiskid desired pressure value, and
sending, by the brake control system, a second current command value to the brake control device in response to the manual brake control being operated, the second current command value corresponding to a minimum value of the pilot desired pressure value and the antiskid desired pressure value.

7. The method of claim 3, wherein the antiskid desired pressure value is determined independent from the DK.

8. A brake control system, comprising:
a set of pilot controls including an auto-brake control and a manual brake control;
a brake control unit (BCU) comprising a brake control executive (BKX) and a switch logic, the BKX in electronic communication with the switch logic;
a deceleration control (DK) in electronic communication with the BCU,
wherein the DK is configured to receive a deceleration command from the auto-brake control, a wheel speed value associated with one or more wheels, and a wheel acceleration value associated with the one or more wheels, the DK is configured to send a DK desired pressure value for each of the one or more wheels to the BKX, the DK desired pressure value based upon the wheel speed value and the wheel acceleration value; and
an antiskid control (ASK) in electronic communication with the BCU,
wherein the BKX is configured to receive an ASK desired pressure value from the ASK,
wherein the switch logic is configured to send at least one of the DK desired pressure value from the DK to the BKX or a pilot desired pressure value from the manual brake control to the BKX.

9. The brake control system of claim 8, wherein, in response to the BCU receiving both the DK desired pressure value and the pilot desired pressure value simultaneously, the switch logic is configured to send the pilot desired pressure value to the BKX.

10. The brake control system of claim 8, further comprising a pressure control unit (PK),
wherein the PK is configured to receive a pressure command and output a current command in response to the pressure command; and
an aircraft brake having a brake control device configured to apply at least one of a pressure or force in response to the current command.

11. The brake control system of claim 10, wherein the BKX is configured to set the pressure command to a minimum value selected from the DK desired pressure value and the ASK desired pressure value.

12. The brake control system of claim 10, wherein the BKX is configured to set the pressure command to a minimum value selected from the pilot desired pressure value and the ASK desired pressure value.

13. The brake control system of claim 8, wherein the pilot desired pressure value and the DK desired pressure value are received in parallel by the BCU.

14. A brake control system, comprising:
a set of pilot controls including an auto-brake control and a manual brake control;
a brake control unit (BCU) comprising a brake control executive (BKX) and a switch logic, the BKX in electronic communication with the switch logic;
a deceleration control (DK) in electronic communication with the BCU;
an antiskid control (ASK) in electronic communication with the BCU;
a processor; and
a tangible, non-transitory memory configured to communicate with the processor, the tangible, non-transitory memory having instructions stored thereon that, in response to execution by the processor, cause the brake control system to perform operations comprising:
receiving, by the DK, a deceleration command from an auto-brake control;
receiving, by the DK, a wheel speed value associated with one or more wheels;

receiving, by the DK, a wheel acceleration value associated with the one or more wheels;

generating, by the DK, a DK desired pressure value for each of the one or more wheels, the DK desired pressure value based upon the deceleration command, wheel speed value, and the wheel acceleration value;

receiving, by the BKX, an ASK desired pressure value from the ASK;

sending, via the switch logic, at least one of the DK desired pressure value from the DK to the BKX or a pilot desired pressure value from the manual brake control to the BKX; and controlling, by the brake control system, a braking force for the one or more wheels based upon the DK desired pressure value.

15. The brake control system of claim 14, wherein the operations further comprise:

detecting, by the brake control system, an aircraft speed;

determining, by the brake control system, that the aircraft speed is at least one of equal to or greater than a threshold value;

determining, by the brake control system, that an auto-brake control has been enabled; and receiving, by the brake control system, the ASK desired pressure value that is output from the ASK.

16. The brake control system of claim 14, wherein the operations further comprise receiving, by the brake control system, a desired pressure in response to the aircraft speed being at least one of equal to or greater than the threshold value, wherein the desired pressure is selected from the DK desired pressure value and the pilot desired pressure value, and the receiving the desired pressure comprises receiving the DK desired pressure value in response to the auto-brake control being enabled and receiving the pilot desired pressure value in response to a manual control being operated.

17. The brake control system of claim 16, wherein the operations further comprise sending, by the brake control system, a pressure command from the BKX to a pressure control (PK), the pressure command comprising a minimum value of the DK desired pressure value and the ASK desired pressure value.

18. The brake control system of claim 16, wherein the operations further comprise sending, by the brake control system, a pressure command from the BKX to a pressure control (PK), the pressure command comprising a minimum value of the pilot desired pressure value and the ASK desired pressure value.

* * * * *